US011122149B2

(12) United States Patent
Rossman et al.

(10) Patent No.: US 11,122,149 B2
(45) Date of Patent: Sep. 14, 2021

(54) SCREEN SHARING VIA A THIN CLIENT APPLICATION

(71) Applicant: Microsoft Technology Licensing, LLC, Redmond, WA (US)

(72) Inventors: Sabra Alexis Wieditz Rossman, Bellevue, WA (US); Alexey Goloshubin, Redmond, WA (US); Kshitij Mahendru, Kirkland, WA (US); Shivaram Prabhakar, Bothell, WA (US); Sharad Bajaj, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/504,177

(22) Filed: Jul. 5, 2019

(65) Prior Publication Data

US 2020/0177705 A1   Jun. 4, 2020

Related U.S. Application Data

(60) Provisional application No. 62/773,978, filed on Nov. 30, 2018.

(51) Int. Cl.
  *H04L 29/06* (2006.01)
(52) U.S. Cl.
  CPC .......... *H04L 67/38* (2013.01); *H04L 65/4069* (2013.01)
(58) Field of Classification Search
  CPC ............................ H04L 67/38; H04L 65/4069
  USPC ........................................................ 709/217
  See application file for complete search history.

(56) References Cited

U.S. PATENT DOCUMENTS

| 9,686,334 | B2 | 6/2017 | Chen |
| 10,462,216 | B1 * | 10/2019 | Vysotsky ................ H04L 67/08 |
| 2006/0184614 | A1 | 8/2006 | Baratto et al. |
| 2008/0034037 | A1 | 2/2008 | Ciudad et al. |
| 2011/0276619 | A1 | 11/2011 | Khan et al. |
| 2013/0132485 | A1 | 5/2013 | Thomas et al. |
| 2013/0194374 | A1 | 8/2013 | Kieft et al. |

(Continued)

FOREIGN PATENT DOCUMENTS

WO    2017060866 A1    4/2017

OTHER PUBLICATIONS

"A Study of WebRTC Security", Retrieved From: http://webrtc-security.github.io/, Retrieved Date: Feb. 25, 2020, 33 Pages.

(Continued)

*Primary Examiner* — Glenford J Madamba
(74) *Attorney, Agent, or Firm* — Newport IP, LLC; Scott Y. Shigeta

(57) ABSTRACT

A server device may host a communication application that remotely accessed by a computing device. Display data generated by a remotely accessed application is communicated to the computing device from the server device. The display data generated by the remotely accessed application is communicated from the computing device to another computing device associated with a user participating in the communication session hosted by the communication application. A communication application executing on the other computing device displays a user interface of the remotely accessed application by processing the display data.

20 Claims, 8 Drawing Sheets

(56) References Cited

U.S. PATENT DOCUMENTS

| | | |
|---|---|---|
| 2016/0105472 A1 | 4/2016 | Chitroda et al. |
| 2017/0272824 A1 | 9/2017 | Bunner |
| 2017/0353419 A1 | 12/2017 | Zemek et al. |
| 2019/0238599 A1* | 8/2019 | Ingale .................... G06F 9/452 |

OTHER PUBLICATIONS

"International Search Report and Written Opinion Issued in PCT Application No. PCT/US19/062714", dated Feb. 12, 2020, 12 Pages.

* cited by examiner

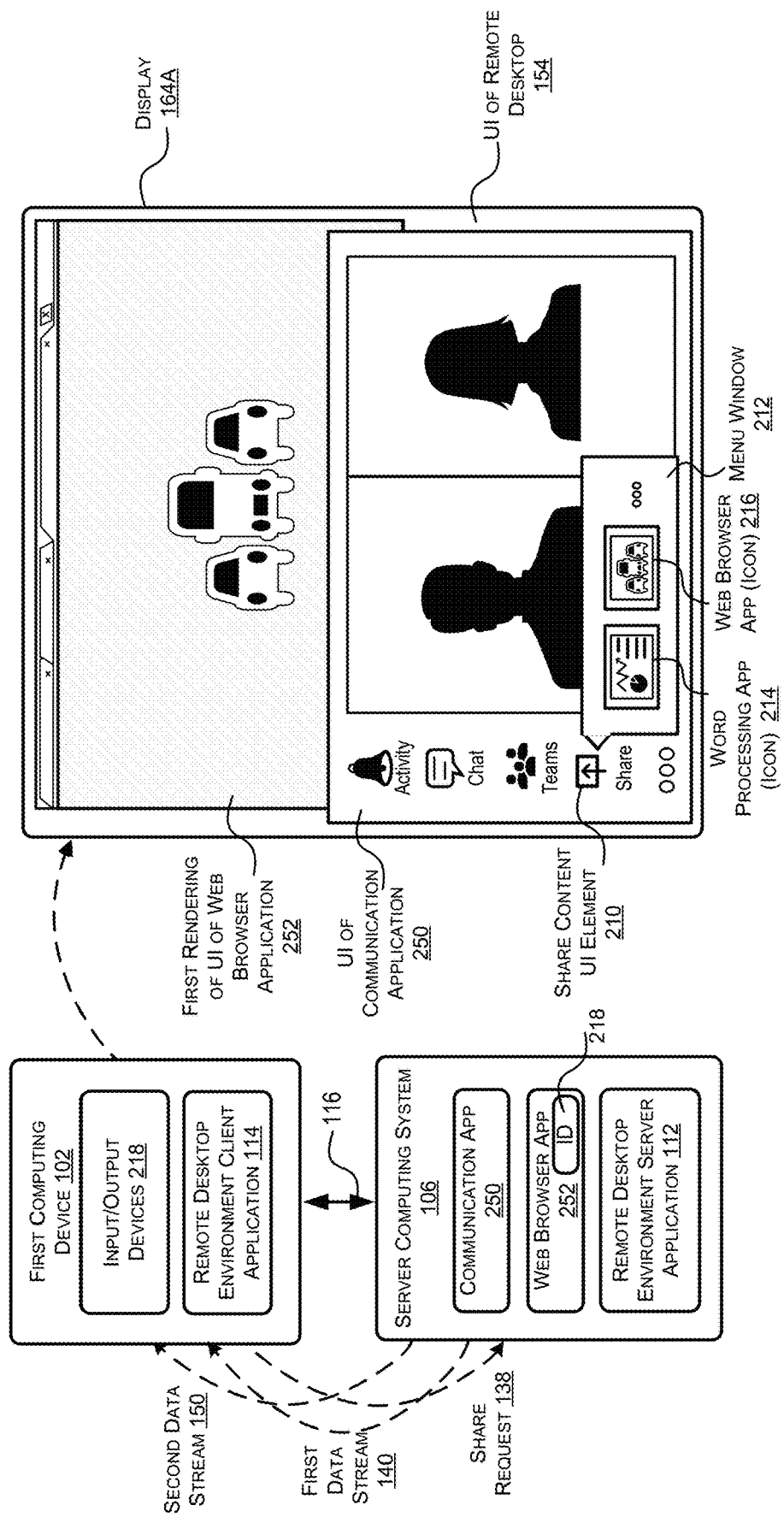

SCREEN SHARING VIA A THIN CLIENT APPLICATION

PRIORITY APPLICATION

This application claims the benefit of and priority to U.S. Provisional Application No. 62/773,978 filed Nov. 30, 2018, the entire contents of which are incorporated herein by reference.

BACKGROUND

Computer-implemented communication systems manage sources of audio and video to bring individuals at different sites together for communication sessions. A communication session may be a simple conversation between two people in private offices or involve several sites with more than one person in large rooms at different sites. Besides the audio and visual transmission of meeting activities, communication systems can be used to share documents, computer displayed information, and whiteboards.

Remote desktop environments may be used by enterprises that have sensitive data and applications that, for security reasons and the like, should not reside on client-side machines. Consequently, with remote desktop environments, a "thin" client may run on client-side machines with the sensitive data and applications running on a server controlled by an enterprise. In particular, the data and applications are stored and executed at the server, and a user interface is provided on the client-side machine to enable a user to access the data and applications implemented at the server.

Communication applications may run as remote applications in a remote desktop environment. The communication applications may take audio/video data captured from the client-side machine, encode the data, and transmit the encoded data over wireless or wireline networks. In addition, those communication applications may receive an encoded data stream from a network, decode the encoded data stream, and render the decoded data stream on the client-side machine.

Some communication applications may be used to share content, such as data files, application and operating system (OS) generated screens, and so forth. In non-remoted environments, sharing content can be implemented via a direct connection between a computing device hosting the shared content and an another computing device receiving the shared content. In contrast, in a remote desktop environment, the content for sharing is hosted on a server. Currently, communication applications that enable sharing of content hosted in a remote desktop environment have not been realized.

Therefore, there remains a technical need to provide techniques for sharing content hosted in a remote desktop environment.

SUMMARY

The technologies described herein address the technical need to provide techniques for sharing content hosted in a remote desktop environment. A server device may host and execute a communication application that is interfaced remotely by a computing device. The communication application hosted by the server device allows a user to communicate with others participating in a communication session.

A user of the computing device may wish to share an application window, such as a user interface of the application, with another user using the communication application. The display data of the application window is communicated to the computing device from the server. The display data of the application window is communicated from the computing device to another computing device associated with a user participating in the communication session. A communication application executing on the other computing device processes the display data of the application window to display a rendering of the application window.

In some implementations, content to be shared is stored on a server that provides a remote desktop environment. Content to be shared may be communicated to the computing device from the server. The computing device, in turn, shares the content over a direct communications link with another computing device. The direct communications link may also be used for audio and video data exchanged between the computing devices during an ongoing communication session.

In some implementations, the direct communications link may be arranged by an application, such as an operating system (OS) or an application of the OS, running locally on the computing device. The direct communications link may be used primarily to transmit and receive real-time media data (e.g., audio and video data) communicated between two computing devices. The application may also interface with applications hosted in a remote desktop environment, such as a communication application hosted by the server.

A user of a computing device may request to share content via the communication application hosted by the server. For example, the user may request to share a desktop associated an OS, an OS window, application content, attachments, notes, and the like. In a remote desktop environment, the shared content is hosted on the server. In some embodiments, the direct communications link between the two computing devices is leveraged when a user shares content via the communication application.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithm(s), hardware logic, and/or operation(s) as permitted by the context described above and throughout the document.

BRIEF DESCRIPTION OF THE DRAWING

The detailed description is described with reference to the accompanying figures. In the figures, the left-most digit(s) of a reference number identifies the figure in which the reference number first appears. The same reference numbers in different figures indicate similar or identical items.

FIGS. 2A and 2B illustrate an exemplary screen sharing scenario in the computing environment shown in FIG. 1, according to embodiments presented herein.

DETAILED DESCRIPTION

The technologies described herein address the technical need to provide techniques for sharing content associated with a remote desktop environment. A server device may host and execute a communication application that is remotely accessed by a computing device. The communication application allows a user to communicate with others in a communication session.

The user may wish to share an application user interface (UI) or window using a communication application associated with a remote desktop environment. The display data of the application UI is communicated to the computing device from the server device. The display data of the application UI is streamed to the computing device using a data stream that is separate from a data stream used to communicate the display data of the remote desktop environment displayed at the computing device.

The display data of the application UI is communicated from the computing device to another computing device associated with another user participating in the communication session. A communication application on the other computing device processes the display data to render the application UI on a display associated with the other computing device.

Figure 1:
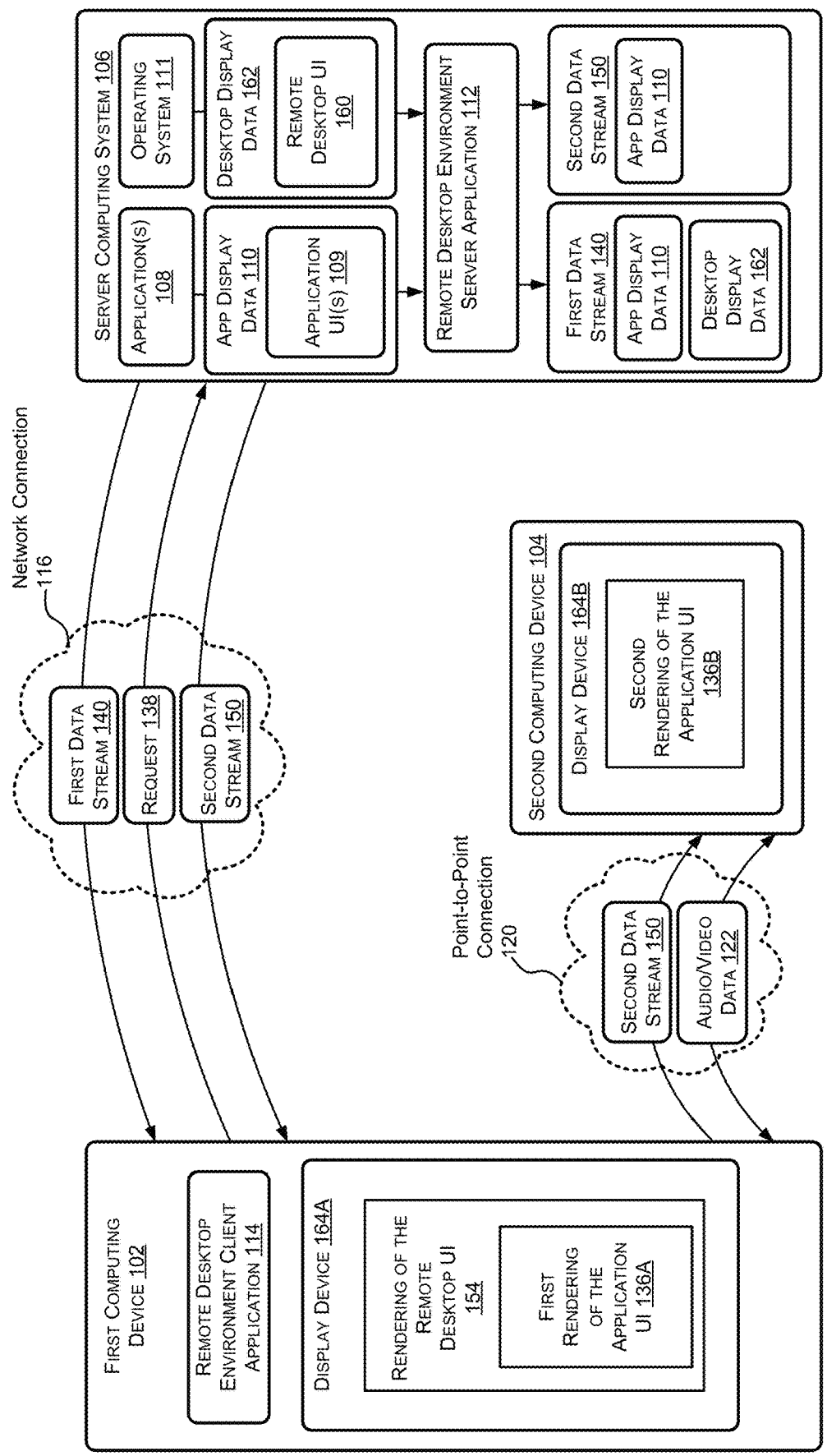
FIG. 1 illustrates an exemplary computing environment that can implement aspects of the technologies presented herein.

FIG. 1 illustrates a computing environment that can enable content sharing, such as screen sharing, between a first computing device 102 and a second computing device 104. The environment may further include a server computing system 106, also referred herein as a data processing system 106.

The server computing system 106 may host one or more applications 108 that may be displayed and used via at least at the computing device 102. The one or more applications 108 may be a web browser application, a productivity application, such as a word processing application or spreadsheet application, a communication application, or the like.

In one implementation of the computing environment, the computing device 102 is a "thin" client device configured with minimal processing and storage capabilities. The computing device 102 may be implemented as a thin client, as the server computing system 106 performs much of the processing and storage on behalf of the computing device 102. The computing device 104 may also be a thin client. In some implementations, the disclosed thin clients have insufficient storage space to store and execute applications, such as productivity applications (e.g., the applications 108), web browser applications and the like. In some embodiments, the computing devices 102 and 104 do not have mass storage devices, such as hard drives.

The server computing system 106 includes a remote desktop environment server application 112. Likewise, the computing device 102 includes a remote desktop environment the client application 114. The applications 112 and 114 implement data communication between the computing device 102 and the server computing system 106 to allow the computing device 102 to use one or more of the applications 108 and an operating system (OS) 111 hosted by the server computing system 106. Furthermore, the applications 112 and 114 cooperatively interface to allow for data exchange between the computing device 102 and the server computing system 106.

The computing device 102 and the server computing system 106 may communicate over wireless or wireline network connection 116. The connection 116 may be a network connection, such as the Internet, an enterprise local or distributed network, combinations of such networks, and the like.

In some implementations, at least one of the applications 108 hosted by the server computing system 106 is a communication application (illustrated in FIGS. 2A-2B) that allows the computing device 102 to exchange audio and video data with the computing device 104. In some implementations, the communication application is a collaboration communication application that allows users located at disparate locations to share audio and video data, group chat, and collaborate on application data. In some implementations, the communication application is the TEAMS or SKYPE communication application, provided by MICROSOFT CORPORATION.

The communication application can enable sharing of content that is provided by an application 108, such as a web browser UI window, OS desktop UI, productivity application UI, and the like. More specifically, the communication application may provide sharing of content, such as a UI window, associated with a word processing application, a spreadsheet application, other types of productivity applications, a web browser application, an OS (i.e., OS application), and the like.

In some examples, the communication application may enable UI window or screen sharing, such one or more UI windows generated by the communication application, the web browser application, or other applications hosted and executed by the server computing system 106. Furthermore, the communication application might further enable file sharing, OS desktop sharing, OS window sharing, and the like.

A user of the computing device 104 may access one of the applications 108 stored on the server computing system 106 through the remote desktop environment client application 114. Specifically, the client application 114 provides a graphical user interface (GUI) that allows the user of the computing device 104 to select and execute the applications 108. Upon selection of one of applications 108 via the client application 114, the client application 114 communicates a message, to cause the execution of the selected application 108, to the server computing system 106 via the network connection 116.

The message is received by the server computing system 106 and communicated to the remote desktop environment server application 112. The remote desktop environment server application 112, in turn, executes the selected application 108. Execution and processing of the selected application 108 occurs at the server computing system 106. The server application 112 interfaces with the selected application 108 to obtain display data 110 representing, when processed, a rendering of an application UI 109 associated with the selected application 108. Furthermore, the remote desktop environment server application 112 may bundle the display data 110 with desktop display data 162 of the OS 111 hosted by the server computing device 106. The desktop display data 162, when processed, may provide a rendering of a remote desktop UI 160. The display data 110 may include display data associated with multiple applications, such as the communication application, web browser application, productivity application, and the like.

The remote desktop environment server application 112 bundles the application display data 110 with the desktop display data 162 to provide a first data stream 140 that carries the bundled display data. The first data stream 140 may be communicated to the first computing device 100 via the network connection 116. The first computing device 102, via the remote desktop environment client application 114, receives the first data stream 140 and processes the bundled display data including the display data 110 and the desktop display data 162 to provide a rendering, on a display device 164A, of a remote desktop UI 154 and an application UI 136A. The remote desktop UI 154 corresponds to the remote desktop UI 160 and the application UI 136A corresponds to the application UI 109.

As described, one of the applications 108 hosted by the server computing system 106, and remote accessible via the first computing device 102 using the remote desktop environment client application 114, is a communication application. The communication application may enable audio and video communication in a communication session between the computing device 102 and the computing device 104. Furthermore, the communication application may provide content sharing functionality.

More specifically, the communication application may execute on the server computing system 106 and the user interface provided by the communication application can be subsequently rendered on the computing device 102 via the client application 114. However, in some implementations, the server computing system 106 is not responsible for accommodating audio and video exchanges between the computing device 102 and the computing device 104. Rather, upon execution of the communication application on the server computing system 106, the server application 112 instructs the client application 114 to establish a point-to-point communication link 120 (e.g., direct communication link) between the computing device 102 and the computing device 104.

The point-to-point communication link 120 provides a conduit for transmitting audio/video data 122 directly between the computing device 102 and the computing device 104. In this way, the server computing system 106 is relieved of having to relay latency-sensitive data exchanged between the computing device 102 and the computing device 104 during an active communication session enabled by the communication application executing on the server computing system 106 and remotely accessible at the computing device 102.

In some implementations, the point-to-point communication link 120 may be arranged by an application, such as an OS, running locally on the computing device 102. The OS may be stored by the computing device 102 in a flash memory (not illustrated) or another type of storage device.

The point-to-point communication link 120 may be used primarily to transmit and receive real-time media data (e.g., audio/video data 122) communicated between the computing device 102 and the computing device 104.

The audio and video data 122 communicated from the computing device 102 to the computing device 104 may be generated by one or more of the input and output devices of the computing device 102. Those input and output devices may include a microphone, camera, display 164A, and the like.

As discussed above, the communication application is functional to provide content sharing for one or more of the applications 108, such as for the word processing application or the web browser application. As discussed, the communication application may be one of the applications 108 hosted by the server computing system 106. When a user of the communication application, remotely accessible by the computing device 102, requests to share content associated with one of the applications 108, a share request 138 is communicated from the computing device 102 to the server computing system 106.

The share request 138 may be generated and communicated to the server computing system 106 when the user of the communication application selects a share content UI element (shown in FIG. 2A and described below) provided by the communication application. Selection of the share content UI element provided by the communication application is achieved using an input device, such as a mouse, of the computing device 102. The mouse may be one of the input/output devices associated with the computing device 102. The share content UI element may display one or more selectable options to share a window or display of a word processing application, a window or display of the web browser application, or a window or display of another type of application. In some implementations, the request 138 is sent from the client application 114 to the server application 112. The share request 138 may include input data associated with a mouse or other user input, such as via a touch screen and finger, that is generated when the share content UI is selected.

The share request 138 is received by the server computing system 106. The share request 138 causes the remote desktop environment server application 112, using a unique application identifier, to interface with the application 108 that is to provide the content for sharing. In some implementations, the unique application identifier is linked to a word processing application. Furthermore, there may be a unique application identifier linked to the web browser application and other applications 108.

The share request 138 may be linked to a user's request to share a window displaying an instance of the word processing application, for example. The remote desktop environment server application 112 uses the unique application identifier linked to the word processing application to properly locate and identify display data used to render the UI window displaying a current instance of the word processing application. The display data may, for example, be the application display data 110.

The server application 112 retrieves the application display data 110. The application display data 110 is associated with a second data stream 150. The server application 112 communicates the second data stream 150 to the first computing device 102. In some implementations, the second data stream 150 is communicated to the first computing device 102 over the network connection 116. Moreover, the second data stream 150 may be communicated concurrently with the first data stream 140. However, the first data stream 140 and the second data stream 150 are separate data streams.

The second data stream 150 may be received by the remote desktop environment client application 114. Upon receiving the second data stream 150, the client application 114 sends the second data stream 150 to the computing device 104 over the point-to-point communication link 120. Alternatively, the client application 114 may establish another point-to-point communication link that is used to send the second data stream 150 to the computing device 104. The process of providing the second data stream 150 over the point-to-point communication link 120 advantageously eliminates having the server computing system 106 relay the second data stream 150 to the computing device 104.

The second computing device 104 receives the second data stream 150. The second computing device 104 processes the display data 110 of the second data stream 150 to generate a second rendering of the application UI 136B on a display device 164B of the second computing device 104. In some implementations, the application UI 136B corresponds to the application UI 109.

Figure 2A:
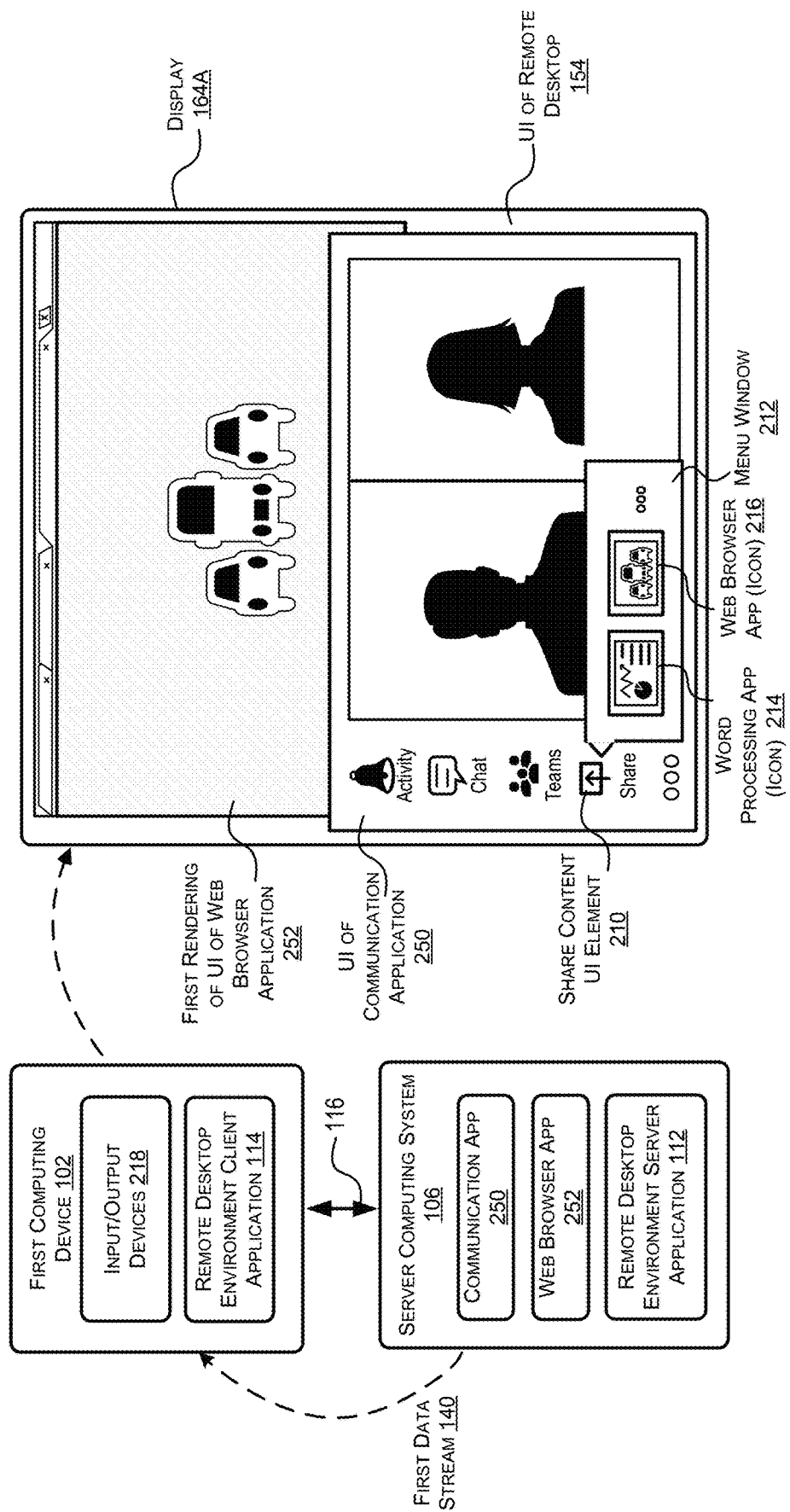

FIGS. 2A and 2B illustrate an exemplary screen sharing scenario in a computing environment. As shown in FIG. 2A and described briefly above, the computing device 102 includes the display 164A, which may be associated with one or more input/output devices 218 of the first computing device 102. The display 164A can present a UI rendering of a communication application 250 executed by the server computing system 106 and remotely accessible by the computing device 102 using the server application 112 in concert with the client application 114.

The computing device 102 can also cause the display 164A to present a UI rendering of the web browser application 252 executed by the computing system 106 and remotely accessible by the computing device 102 via the server application 112 in concert with the client application 114. The UI renderings of the web browser application 252 and the communication application 250 may be associated with the rendering of the remote desktop UI 154.

The server computing device 106 executes the communication application 250 via the server application 112. The server application 112 conveys the application display data 110, representing a UI of the communication application 250, to the client application 114 using the first data stream 140. The client application 114 processes the display data 110 to output a UI rendering of the communication application 250 on the display 164A.

Additionally, the server computing system 106 may also execute additional applications 108 on behalf of the computing device 102. For example, the server application 112 can execute the web browser application 252 in response to a message received from the computing device 102. The server application 112 packages the display data 110, representing a UI rendering of the web browser application 252, with the first data stream 140 conveyed to the client application 114. The client application 114 processes the display data 110 to output a rendering of the web browser application 252 on the display 164A.

The display data 110 may also include other display data, such as the desktop display data 162. The display data 110 streamed to the first computing device 102 may be processed by the remote desktop environment client application 114 to display a comprehensive UI that includes UI renderings of the web browser application 252, communication application 250, and remote desktop 154.

As discussed briefly above, the communication application 250 may include a share content UI element 210. The share content UI element 210 may be selected by a user of the computing device 102, such as using a mouse. Selection of the share content UI element 210 will cause the communication application 250 to display a menu window 212. In this example, two selectable icons 214 and 216 are provided and displayed in the menu window 212. Additional selectable icons may be provided as well, such as icons to share the remote desktop window UI 160, UIs on one or more displays, other applications, and the like.

In the illustrated example, the selectable icon 214 may be selected by user to share a screen generated by the word processing application. The selectable icon 216 may be selected by the user to share a screen of the web browser application 252.

Continuing the example from FIG. 2A, as shown in FIG. 2B, a user of the computing device 102 selects the selectable icon 216 to share a view (i.e., the window or UI) of the web browser application 252. Selection of the selectable icon 216 causes the computing device 102 to convey the share request 138 to the server computer 106. The share request 138 is received by the server application 112.

Data (e.g., mouse input data) associated with the share request 138 indicates that a user of the computing device 102 requests to share a UI view of the web browser application 252. The server application 112 locates or retrieves a web browser application identifier 218. The web browser application identifier 218 is linked to the web browser application 252. As discussed above, each of the applications hosted by the server computing system 106 and capable of being remotely accessed by the computing device 102 will have a unique identifier, similar to the web browser application identifier 218.

The server application 112 uses the web browser application identifier 218 to locate and retrieve the display data 110 associated with a UI view of the web browser application 252. The display data 110 is conveyed to the computing device 102 in the second data stream 150. In some implementations, the client application 114 receives the display data 110 associated with the second data stream 150. As shown in FIG. 2B, the second data stream 150 is communicated concurrently with the first data stream 140. However, the second data stream 150 is a separate and distinct data stream from the first data stream 140.

In some implementations, the display data 110 provided by the server application 112 is display media data of web browser application 252 streamed to the first computing device 102 by way of the second data stream 150. In some implementations, the second data stream 150 carries, exclusively, the display media data of the UI window displaying the instance of the web browser application 252. That is, the second data stream 150 may include payload data that enables a receiving entity, such as the computing device 104, to render and display the UI the web browser application 252.

The server application 112 communicates the second data stream 150 to the first computing device 102. The second data stream 150 causes the first computing device 102, in cooperation with the remote desktop environment client application 114, to communicate the second data stream 150 to the second computing device 104.

Figure 3:
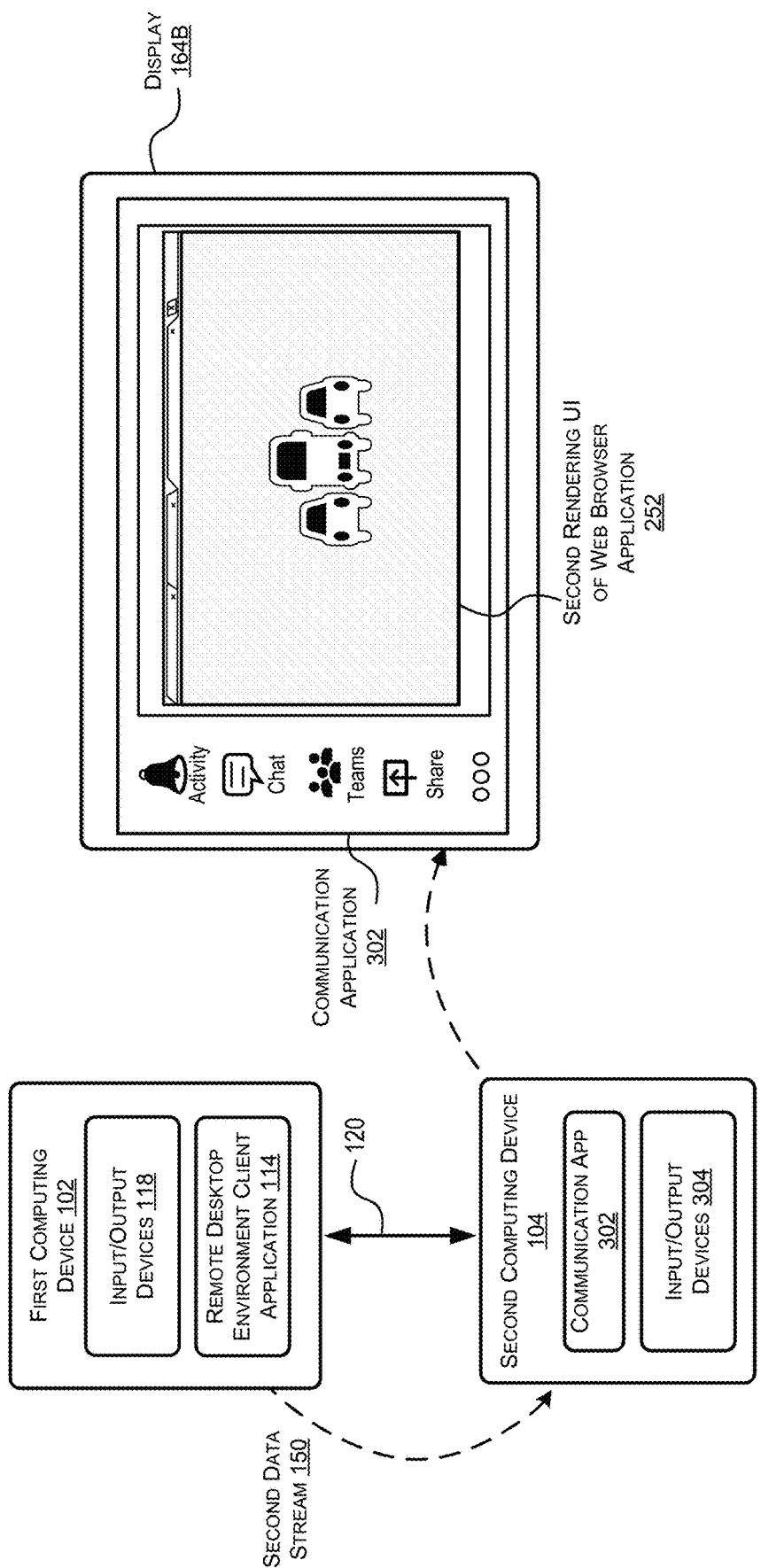
FIG. 3 illustrates an implementation of sharing content from one computing device to another computing device, according to embodiments presented herein.

FIG. 3 illustrates an implementation of sharing content from the first computing device 102 to the second computing device 104. In the illustrated example, the display data 110 associated with the second data stream 150, received by the computing device 102 and the client application 114, may be forwarded (e.g., streamed) to the computing device 104. The second data stream 150 may be communicated to the computing device 104 over the point-to-point communication link 120.

Communication of the second data stream 150 from the computing device 102 to the other computing device 104 occurs, in some implementations, after user selection of the selectable icon 216 displayed in the menu window 212 (see FIG. 2B).

The computing device 104 may execute a communication application 302. In some implementations, the communication application 302 may be similar to the communication application 250 that is remotely accessible by the computing device 102 via the server computer 106. The communication application 302 may receive the display data 110 associated with the second data stream 150.

The computing device 104 may include one or more input and output devices 304, to include the display 164B. Those input and output devices 304 may further include a microphone, camera, and the like.

The communication application 302 processes the display data 110 associated with the second data stream 150. Specifically, the communication application 302 processes the display data 110 to provide a second UI rendering of web Browser application 252.

Figure 4:
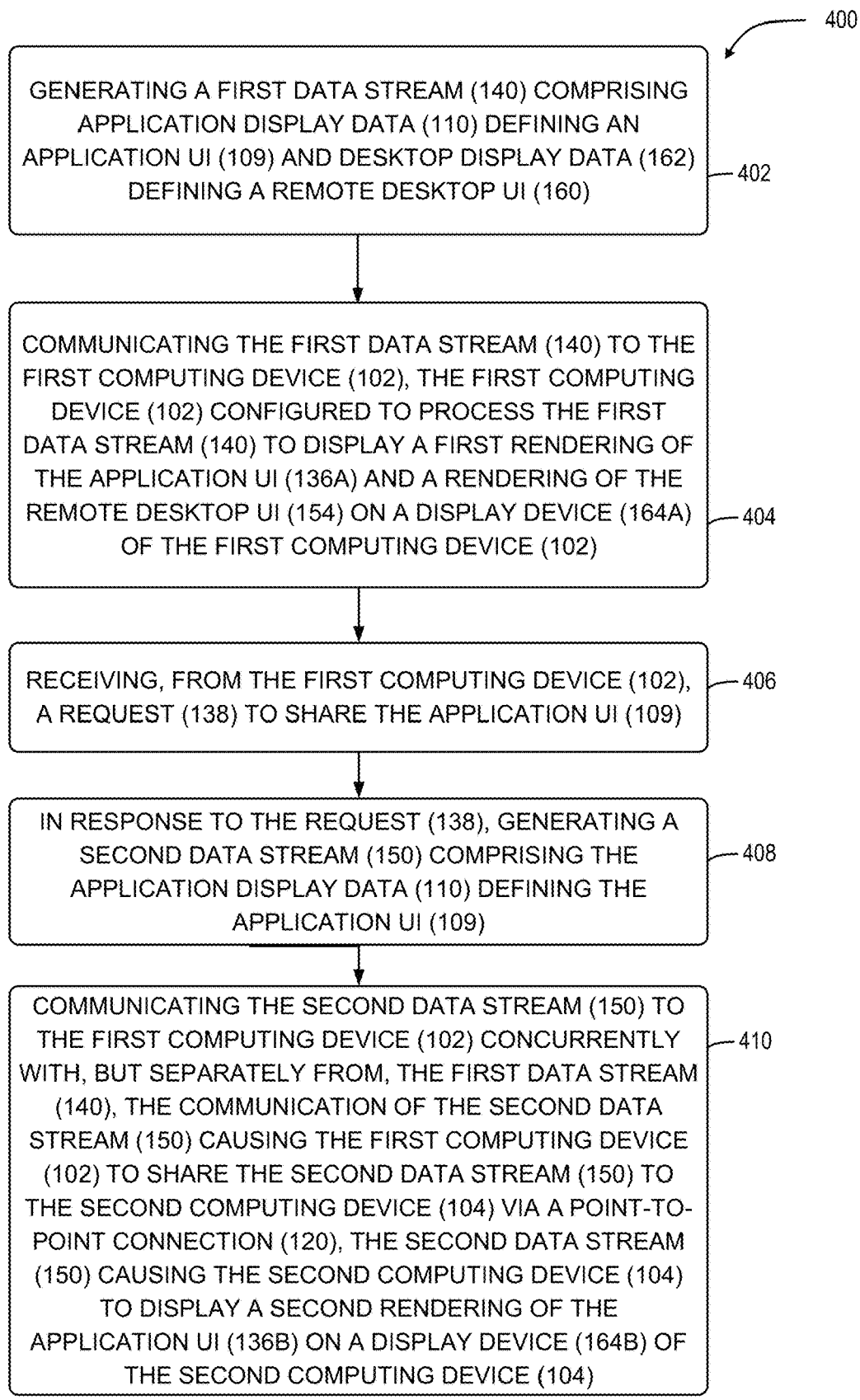
FIG. 4 is a flow chart diagram showing a routine that illustrates operations associated with content sharing techniques in an environment.

FIG. 4 is a flow diagram showing a routine 400 that illustrates operations associated with content sharing in a remote desktop environment. In some implementations, the operations of FIG. 4 can be performed by components of one or more computing devices, such one or more of the devices 102 and 104 and/or the server computing device 106. Therefore, the instructions associated with the example flowchart 400 may be executed by one or more processors associated with server-side components (e.g., the server computing device 106) and/or client-side components (one or more of the devices 102 and 104).

It should be understood by those of ordinary skill in the art that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, performed together, and/or performed simultaneously, without departing from the scope of the appended claims. Furthermore, the operations disclosed herein and illustrated in FIGS. 4 and 5 include reference numbers for illustrative purposes only, and the inclusion of those reference numbers does not represent that the associated structure is necessarily required to perform the disclosed operations.

It also should be understood that the illustrated methods can end at any time and need not be performed in their entireties. Some or all operations of the methods, and/or substantially equivalent operations, can be performed by execution of computer-readable instructions included on a computer-storage media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system (e.g., the system 100, the device(s) 102 and 104 and/or, the server computing device 106) and/or (2) as interconnected machine logic circuits or circuit modules within the computing system. The implementation is a matter of choice dependent on the performance and other requirements of the computing system. Accordingly, the logical operations may be implemented in software, in firmware, in special purpose digital logic, and any combination thereof. Furthermore, the logical operations described herein may be implemented by a single computing device, such as a client device or a server device. Alternatively, the logical operations described herein may be implemented by a combination of server devices and client devices.

The routine 400 may begin at operation 402, where a server hosts a communication application. The communication application is remotely accessible by a computing device. Remote access of the communication application is achieved through streaming of the data associated with the communication application from the server to the computing device. At operation 402, the server generates a first data stream comprising application display data defining the application UI of an application hosted by the server and desktop display data defining a remote desktop UI.

At operation 404, the server communicates the first data stream to the first computing device, the first computing device is configured to process the first data stream to display a first rendering of the application UI and a rendering of the remote desktop UI on a display device of the first computing device.

At operation 406, the server receives, from the first computing device, a request to share the application UI.

At operation 408, the server, in response to the request, generates a second data stream comprising the application display data defining the application UI.

At operation 410, the server communicates the second data stream to the first computing device concurrently with, but separately from, the first data stream. The communication of the second data stream causing the first computing device to share the second data stream to the second computing device via a point-to-point connection, the second data stream causing the second computing device to display a second rendering of the application UI on a display device of the second computing device.

In some implementations, one or more of the operations 402-410 are performed as a computer background process that is insulated or hidden from a user. Specifically, the operations 402-410 may be executed as a background thread by an operating system, such as the MICROSOFT WINDOWS operating system, software application, and so forth.

Figure 5:
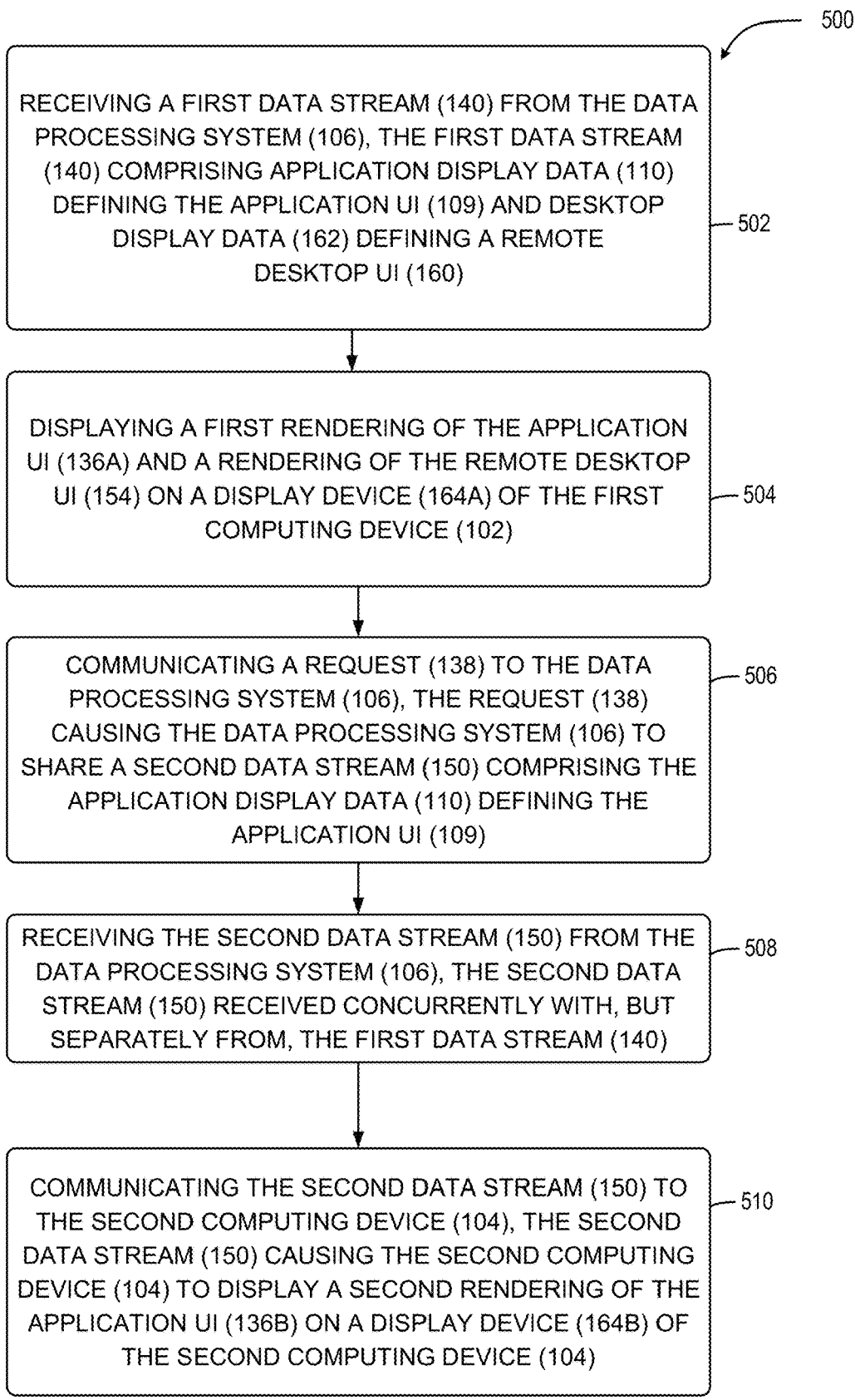
FIG. 5 is a flow chart diagram showing a routine that illustrates additional operations associated with content sharing techniques in an environment.

FIG. 5 is a flow diagram showing a routine 500 that illustrates additional operations associated with content sharing in a remote desktop environment. In some implementations, the operations of FIG. 5 can be performed by components of one or more computing devices, such one or more of the devices 102 and 104 and/or the server computer 106. Therefore, the instructions associated with the example routine 500 may be executed by one or more processors associated with server-side components (e.g., the server computer 106) and/or client-side components (one or more of the devices 102 and 104).

The routine 500 begins at operation 502, where first computing device receives a first data stream from the data processing system, the first data stream comprising application display data defining the application UI and desktop display data defining a remote desktop UI.

At operation 504, the first computing device displays a first rendering of the application UI and a rendering of the remote desktop UI on a display device of the first computing device.

At operation 506, the first computing device communicates a request to the data processing system, the request causing the data processing system to share a second data stream comprising the application display data defining the application UI.

At operation 508, the first computing device receives the second data stream from the data processing system, the second data stream received concurrently with, but separately from, the first data stream.

At operation 510, the first computing device communicates the second data stream to the second computing device, the second data stream causing the second computing device to display a second rendering of the application UI on a display device of the second computing device.

Figure 6:
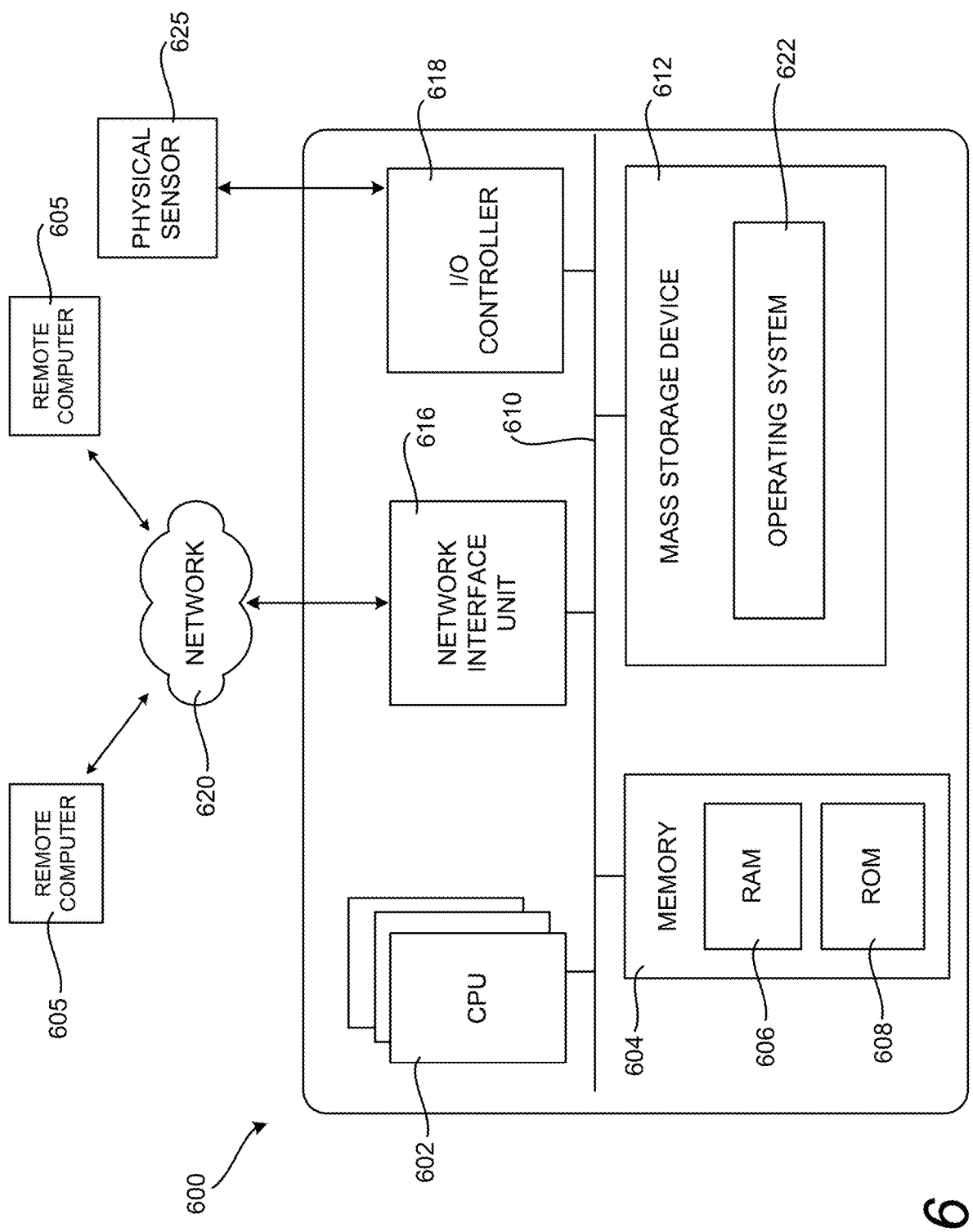
FIG. 6 is a computer architecture diagram showing an illustrative computer hardware and software architecture for a computing device that can implement aspects of the technologies presented herein.

FIG. 6 is a computer architecture diagram showing an illustrative computer hardware and software architecture for a computing device 600 that can implement the various technologies presented herein. In particular, the architecture illustrated in FIG. 6 can be utilized to implement a server computer, mobile phone, an e-reader, a smartphone, a desktop computer, an AR/VR device, a tablet computer, a laptop computer, or another type of computing device. In some implementations, the devices 102, 104 and the server computer 106 implement some or all of the elements and functionalities associated with the computing device 600. In some implementations, the devices 102 and 104 are thin clients. Therefore, the devices 102 and 104 may include minimal processing and storage capability, sufficient to render UIs of applications hosted by the server computer 106.

The computer 600 illustrated in FIG. 6 includes a central processing unit 602 (CPU), a system memory 604, including a random-access memory 606 (RAM) and a read-only memory (ROM) 608, and a system bus 610 that couples the memory 604 to the CPU 602. A basic input/output system (BIOS" or "firmware") containing the basic routines that help to transfer information between elements within the computer 600, such as during startup, can be stored in the ROM 608. The computer 600 further includes a mass storage device 612 for storing an operating system 622, application programs, and other types of programs. The mass storage device 612 can also be configured to store other types of programs and data.

The mass storage device 612 is connected to the CPU 602 through a mass storage controller (not shown on FIG. 6) connected to the bus 610. The mass storage device 612 and its associated computer readable media provide non-volatile storage for the computer 600. Although the description of computer readable media contained herein refers to a mass storage device, such as a hard disk, CD-ROM drive, DVD-ROM drive, or USB storage key, it should be appreciated by those skilled in the art that computer readable media can be any available computer storage media or communication media that can be accessed by the computer 600.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner so as to encode information in the signal. By way of example, and not limitation, communication media includes wired media such as a wired network or direct-wired connection, and wireless media such as acoustic, radio frequency, infrared and other wireless media. Combinations of the any of the above should also be included within the scope of computer readable media.

By way of example, and not limitation, computer storage media can include volatile and non-volatile, removable and non-removable media implemented in any method or technology for storage of information such as computer readable instructions, data structures, program modules or other data. For example, computer storage media includes, but is not limited to, RAM, ROM, EPROM, EEPROM, flash memory or other solid-state memory technology, CD-ROM, digital versatile disks (DVD), HD-DVD, BLU-RAY, or other optical storage, magnetic cassettes, magnetic tape, magnetic disk storage or other magnetic storage devices, or any other medium that can be used to store the desired information and which can be accessed by the computer 600. For purposes of the claims, the phrase "computer storage medium," and variations thereof, does not include waves or signals per se or communication media.

According to various configurations, the computer 600 can operate in a networked environment using logical connections to remote computers through a network such as the network 620. In some implementations, the network 116 provides at least some or all of the same functionalities as the network 620. The computer 600 can connect to the network 620 through a network interface unit 616 connected to the bus 610. It should be appreciated that the network interface unit 616 can also be utilized to connect to other types of networks and remote computer systems.

The computer 600 can also include an input/output controller 618 for receiving and processing input from a number of other devices, including a keyboard, mouse, touch input, an electronic stylus (not shown in FIG. 6), or a physical sensor such as a video camera. Similarly, the input/output controller 618 can provide output to a display screen or other type of output device (also not shown in FIG. 6).

It should be appreciated that the software components described herein, when loaded into the CPU 602 and executed, can transform the CPU 602 and the overall computer 600 from a general-purpose computing device into a special-purpose computing device customized to facilitate the functionality presented herein. The CPU 602 can be constructed from any number of transistors or other discrete circuit elements, which can individually or collectively assume any number of states. More specifically, the CPU 602 can operate as a finite-state machine, in response to executable instructions contained within the software modules disclosed herein. These computer-executable instructions can transform the CPU 602 by specifying how the CPU 602 transitions between states, thereby transforming the transistors or other discrete hardware elements constituting the CPU 602.

Encoding the software modules presented herein can also transform the physical structure of the computer readable media presented herein. The specific transformation of physical structure depends on various factors, in different implementations of this description. Examples of such factors include, but are not limited to, the technology used to implement the computer readable media, whether the computer readable media is characterized as primary or secondary storage, and the like. For example, if the computer readable media is implemented as semiconductor-based memory, the software disclosed herein can be encoded on the computer readable media by transforming the physical state of the semiconductor memory. For instance, the software can transform the state of transistors, capacitors, or other discrete circuit elements constituting the semiconductor memory. The software can also transform the physical state of such components in order to store data thereupon.

As another example, the computer readable media disclosed herein can be implemented using magnetic or optical technology. In such implementations, the software presented herein can transform the physical state of magnetic or optical media, when the software is encoded therein. These transformations can include altering the magnetic characteristics of particular locations within given magnetic media. These transformations can also include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer 600 in order to store and execute the software components presented herein. It also should be appreciated that the architecture shown in FIG. 6 for the computer 600, or a similar architecture, can be utilized to implement other types of computing devices, including hand-held computers, video game devices, embedded computer systems, mobile devices such as smartphones, tablets, and AR/VR devices, and other types of computing devices known to those skilled in the art. It is also contemplated that the computer 600 might not include all of the components shown in FIG. 6, can include other components that are not explicitly shown in FIG. 6, or can utilize an architecture completely different than that shown in FIG. 6.

Figure 7:
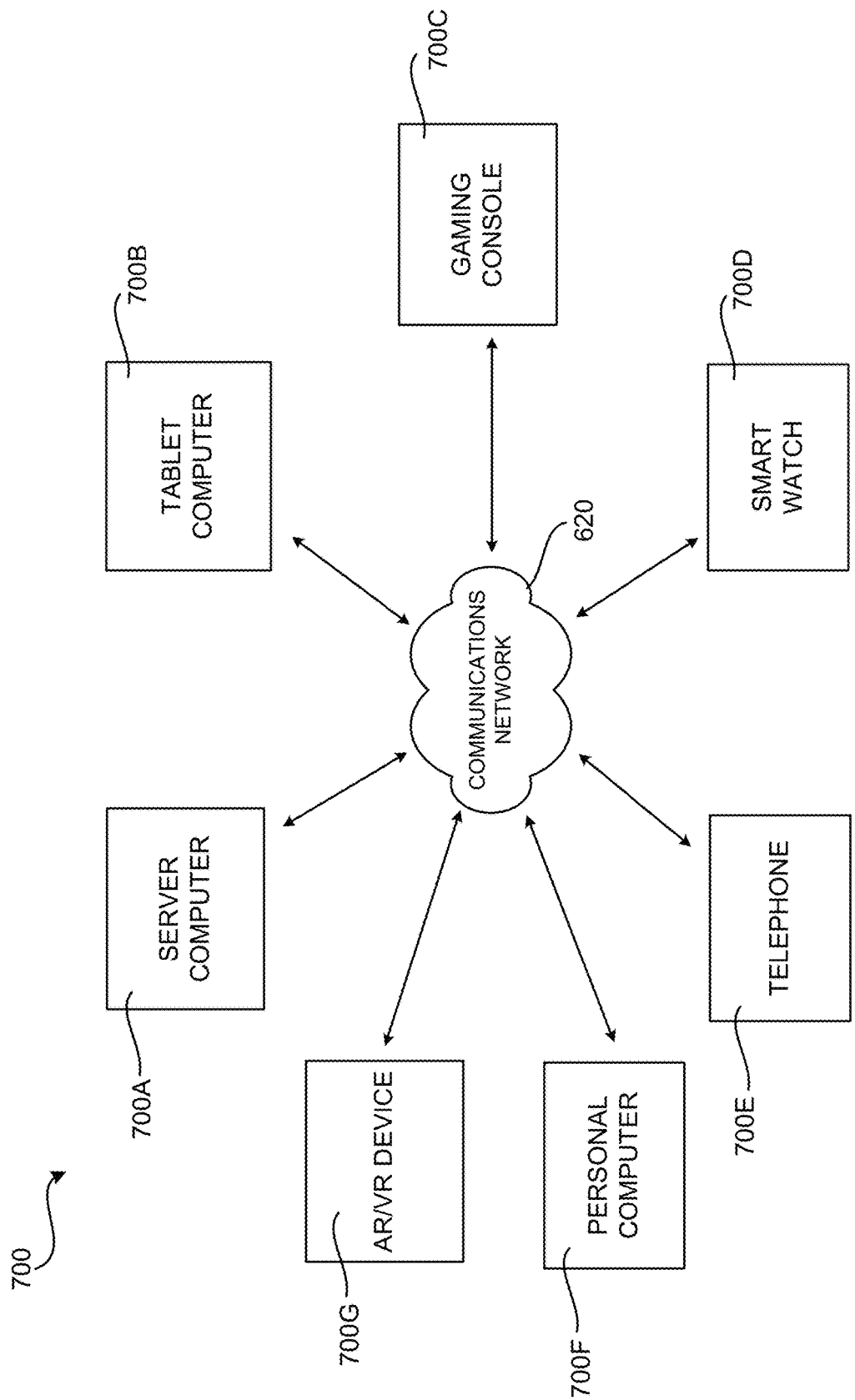
FIG. 7 is a network diagram illustrating a distributed computing environment in which aspects of the disclosed technologies can be implemented.

FIG. 7 is a network diagram illustrating a distributed network computing environment 700 in which aspects of the disclosed technologies can be implemented, according to various embodiments presented herein. The server computer 106 may implement at least some of the distributed network computing environment 700 to provide distributed storage for remotely accessible computing environments, via one or more distributed physical or virtual storages associated with one or more computing devices.

As shown in FIG. 7, one or more server computers 700A can be interconnected via a communications network 620 (which may be either of, or a combination of, a fixed-wire or wireless LAN, WAN, intranet, extranet, peer-to-peer network, virtual private network, the Internet, Bluetooth communications network, proprietary low voltage communications network, or other communications network) with a number of devices such as, but not limited to, a tablet computer 700B, a gaming console 700C, a smart watch 700D, a telephone 700E, such as a smartphone, a personal computer 700F, and an AR/VR device 700G.

In a network environment in which the communications network 620 is the Internet, for example, the server computer 700A can be a dedicated server computer operable to process and communicate data to and from the devices 700B-700G via any of a number of known protocols, such as, hypertext transfer protocol (HTTP), file transfer protocol (FTP), or simple object access protocol (SOAP). Additionally, the networked computing environment 700 can utilize various data security protocols such as secured socket layer (SSL) or pretty good privacy (PGP). Each of the devices 700B-700G can be equipped with an operating system operable to support one or more computing applications or terminal sessions such as a web browser (not shown in FIG. 7), or other graphical user interface (not shown in FIG. 7), or a mobile desktop environment (not shown in FIG. 7) to gain access to the server computer 700A.

The server computer 700A can be communicatively coupled to other computing environments (not shown in FIG. 7) and receive data regarding a participating user's interactions/resource network. In an illustrative operation, a user (not shown in FIG. 7) may interact with a computing application running on a device 700B-700G to obtain desired data and/or perform other computing applications.

The data and/or computing applications may be stored on the server 700A, or servers 700A, and communicated to cooperating users through the devices 700B-700G over an exemplary communications network 620. A participating user (not shown in FIG. 7) may request access to specific data and applications housed in whole or in part on the server computer 700A. These data may be communicated between the devices 700B-700G and the server computer 700A for processing and storage.

The server computer 700A can host computing applications, processes and applets for the generation, authentication, encryption, and communication of data and applications, and may cooperate with other server computing environments (not shown in FIG. 7), third party service providers (not shown in FIG. 7), network attached storage (NAS) and storage area networks (SAN) to realize application/data transactions.

It should be appreciated that the computing architecture shown in FIG. 6 and the distributed network computing environment shown in FIG. 7 have been simplified for ease of discussion. It should also be appreciated that the computing architecture and the distributed computing network can include and utilize many more computing components, devices, software programs, networking devices, and other components not specifically described herein.

This disclosure describes requests, instructions and other communications communicated to various elements associated with one or more computing devices. The disclosed requests, instructions and other communications comprise data communicating or defining the actions to be performed or information conveyed by those requests, instructions and other communications. Furthermore, the described requests, instructions and other communications described herein may be generated by instructions executed by one or more processors of one or more computing devices, such as the server 106 and the computing devices 102 and 104. For example, the instructions may be associated with one or more application programming interfaces (APIs) or other instructions, such as computer code, executed by the one or more processors of the one or more computing devices.

It should be appreciated that the above-described subject matter may be implemented as a computer-controlled apparatus, a computer process, a computing system, or as an article of manufacture such as a computer-readable storage medium. Among many other benefits, the techniques disclosed herein improve efficiencies with respect to a wide range of computing resources. Other technical effects other than those mentioned herein can also be realized from implementations of the technologies disclosed herein.

The operations of the example methods are illustrated in individual blocks and summarized with reference to those blocks. The methods are illustrated as logical flows of blocks, each block of which can represent one or more operations that can be implemented in hardware, software, or a combination thereof. In the context of software, the operations represent computer-executable instructions stored on one or more computer-readable media that, when executed by one or more processors, enable the one or more processors to perform the recited operations.

Generally, computer-executable instructions include routines, programs, objects, modules, components, data structures, and the like that perform particular functions or implement particular abstract data types. The order in which the operations are described is not intended to be construed as a limitation, and any number of the described operations can be executed in any order, combined in any order, subdivided into multiple sub-operations, and/or executed in parallel to implement the described processes. The described processes can be performed by resources associated with one or more device(s) such as one or more internal or external CPUs or GPUs, and/or one or more pieces of hardware logic such as FPGAs, DSPs, or other types of accelerators.

All of the methods and processes described above may be embodied in, and fully automated via, software code modules executed by one or more general purpose computers or processors. The code modules may be stored in any type of computer-readable storage medium or other computer storage device. Some or all of the methods may alternatively be embodied in specialized computer hardware.

Conditional language such as, among others, "can," "could," "might" or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example. Conjunctive language such as the phrase "at least one of X, Y or Z," unless specifically stated otherwise, is to be understood to present that an item, term, etc. may be either X, Y, or Z, or a combination thereof.

Any routine descriptions, elements or blocks in the flow diagrams described herein and/or depicted in the attached figures should be understood as potentially representing modules, segments, or portions of code that include one or more executable instructions for implementing specific logical functions or elements in the routine. Alternate implementations are included within the scope of the examples described herein in which elements or functions may be deleted, or executed out of order from that shown or discussed, including substantially synchronously or in reverse order, depending on the functionality involved as would be understood by those skilled in the art.

EXAMPLE CLAUSES

The disclosure presented herein may be considered in view of the following clauses.

Clause 1. A computer-implemented method performed by a data processing system for enabling a first computing device to concurrently display and share an application user interface (UI) generated by the data processing system with a second computing device, the method comprising: generating a first data stream comprising application display data defining the application UI and desktop display data defining a remote desktop UI; communicating the first data stream to the first computing device, the first computing device configured to process the first data stream to display a first rendering of the application UI and a rendering of the remote desktop UI on a display device of the first computing device; receiving, from the first computing device, a request to share the application UI; in response to the request, generating a second data stream comprising the application display data defining the application UI; and communicating the second data stream to the first computing device concurrently with, but separately from, the first data stream, the communication of the second data stream causing the first computing device to share the second data stream to the second computing device, the second data stream causing the second computing device to display a second rendering of the application UI on a display device of the second computing device.

Clause 2. The computer-implemented method according to clause 1, wherein the application display data is associated with an application hosted by the data processing system, the application executed by the data processing system and remotely accessible by the first computing device.

Clause 3. The computer-implemented method according to any one or more of clauses 1-2, wherein the application hosted by the data processing system is a productivity application or web browser application.

Clause 4. The computer-implemented method according to any one or more of clauses 1-3, wherein the request is received from a communication application, the communication application being a collaboration communication application configured to enable sharing of audio and video data and application data between computing devices.

Clause 5. The computer-implemented method according to any one or more of clauses 1-4, wherein the communication application is hosted by the data processing system.

Clause 6. The computer-implemented method according to any one or more of clauses 1-5, wherein the second data stream causes the first computing device to share the second data stream to the second computing device via a point-to-point a connection.

Clause 7. A computer-implemented method performed by a first computing device for displaying and sharing an application user interface (UI) provided by a data processing system with a second computing device, the method comprising: receiving a first data stream from the data processing system, the first data stream comprising application display data defining the application UI and desktop display data defining a remote desktop UI; displaying a first rendering of the application UI and a rendering of the remote desktop UI on a display device of the first computing device; communicating a request to the data processing system, the request causing the data processing system to share a second data stream comprising the application display data defining the application UI; receiving the second data stream from the data processing system, the second data stream received concurrently with, but separately from, the first data stream; and communicating the second data stream to the second computing device, the second data stream causing the second computing device to display a second rendering of the application UI on a display device of the second computing device.

Clause 8. The computer-implemented method according to clause 7, wherein the communicating the second data stream comprises communicating the second data stream over a point-to-point communication link between the first computing device and the second computing device.

Clause 9. The computer-implemented method according to any one or more of clauses 7-8, wherein the request comprises user input data received at the first computing device.

Clause 10. The computer-implemented method according to any one or more of clauses 7-9, wherein the request is generated from a communication application to allow users at disparate locations to share audio and video data and application data.

Clause 11. The computer-implemented method according to any one or more of clauses 7-10, wherein the communication application is hosted by the data processing system and remotely accessible by the first computing device.

Clause 12. The computer-implemented method according to any one or more of clauses 7-11, wherein the first computing device is a thin client computing device.

Clause 13. The computer-implemented method according to any one or more of clauses 7-12, wherein the first computing device and the second computing device are each a thin client computing device.

Clause 14. The computer-implemented method according to any one or more of clauses 7-13, wherein the request comprises input data associated with a communication application hosted by the data processing system.

Clause 15. The computer-implemented method according to any one or more of clauses 7-14, wherein the communication application hosted by the data processing system is remotely accessible by the first computing device.

Clause 16. An apparatus for enabling a first computing device to share an application user interface (UI) with a second computing device, the apparatus comprising: means for generating a first data stream comprising application display data defining the application UI and desktop display data defining a remote desktop UI; means for communicating the first data stream to the first computing device, the first computing device configured to process the first data stream to display a first rendering of the application UI and a rendering of the remote desktop UI on a display device of the first computing device; means for receiving, from the first computing device, a request to share the application UI; in response to the request, generating a second data stream comprising the application display data defining the application UI; and communicating the second data stream to the first computing device concurrently with, but separately from, the first data stream, the communication of the second data stream causing the first computing device to share the second data stream to the second computing device, the second data stream causing the second computing device to display a second rendering of the application UI on a display device of the second computing device.

Clause 17. The apparatus according to clause 16, wherein the application display data is associated with an application hosted by the apparatus, the application executed by the apparatus and remotely accessible by the first computing device.

Clause 18. The apparatus according to any one or more of clauses 16-17, wherein the application hosted by the apparatus is a productivity application or web browser application.

Clause 19. The apparatus according to any one or more of clauses 16-18, wherein the request is received from a communication application, the communication application being a collaboration communication application configured to enable sharing of audio and video data and application data between computing devices.

Clause 20. The apparatus according to any one or more of clauses 16-19, wherein the communication application is hosted by the apparatus.

It should be emphasized that many variations and modifications may be made to the above-described examples, the elements of which are to be understood as being among other acceptable examples. All such modifications and variations are intended to be included herein within the scope of this disclosure and protected by the following claims.

What is claimed is:

1. A computer-implemented method performed by a data processing system for enabling a first computing device to concurrently display and share a user interface (UI) generated by the data processing system with a second computing device, the method comprising:
generating, at the data processing system, a first data stream comprising display data defining the UI;
communicating, using a network connection between the first computing device and the data processing system, the first data stream to the first computing device, the first computing device configured to process the first data stream to display a first rendering of the UI on a display device of the first computing device;
receiving, from the first computing device, a request to share the UI;
in response to the request, generating, at the data processing system, a second data stream comprising the display data defining the UI; and
communicating, using the network connection between the first computing device and the data processing system, the second data stream to the first computing device concurrently with, but separately from, the first data stream, the communication of the second data stream causing the first computing device to communicate the second data stream to the second computing device, the second data stream causing the second computing device to display a second rendering of the UI on a display device of the second computing device.

2. The computer-implemented method according to claim 1, wherein the application display data is associated with an application hosted by the data processing system, the application executed by the data processing system and remotely accessible by the first computing device.

3. The computer-implemented method according to claim 2, wherein the application hosted by the data processing system is a productivity application or web browser application.

4. The computer-implemented method according to claim 1, wherein the request is received from a communication application, the communication application being a collaboration communication application configured to enable sharing of audio and video data and application data between computing devices.

5. The computer-implemented method according to claim 1, wherein the second data stream causes the first computing device to share the second data stream to the second computing device via a point-to-point connection.

6. The computer-implemented method of claim 1, wherein the second data stream communicated from the first computing device to the second computing device eliminates a need for the data processing system to connect directly to the second computing device.

7. The computer implemented method of claim 1, wherein the connection between the first computing device and the data processing system concurrently comprises the first data stream and the second data stream in response to the request from the first computing device to share the UI.

8. The computer implemented method of claim 1, wherein the first computing device communicates the second data stream to the second computing device via a network connection between the first computing device and the second computing device, wherein the second computing device displays a second rendering of the UI on a display device associated with the second computing device.

9. The computer implemented method of claim 1, wherein the display data further defines desktop display data defining a remote desktop UI, wherein the first computing device is configured to process the first data stream to display the first rendering of the UI and a rendering of the remote desktop UI on the display device of the first computing device, and wherein the second data stream causes the second computing device to display the second rendering of the UI and a second rendering of the remote desktop UI on a display device of the second computing device.

10. A computer-implemented method performed by a first computing device for displaying and sharing a user interface (UI) provided by a data processing system with a second computing device, eliminating a need for the data processing system to connect directly to the second computing device thereby mitigating network congestion, the method comprising:

receiving, using a network connection between the first computing device and the data processing system, a first data stream from the data processing system, the first data stream comprising display data defining the UI;

displaying a first rendering of the UI on a display device of the first computing device;

communicating a request to the data processing system, the request causing the data processing system to communicate a second data stream comprising the display data defining the UI;

receiving, using the network connection between first computing device and the data processing system, the second data stream from the data processing system, the second data stream received concurrently with, but separately from, the first data stream; and communicating the second data stream to the second computing device, the second data stream causing the second computing device to display a second rendering of the UI on a display device of the second computing device.

11. The computer-implemented method according to claim 10, wherein the communicating the second data stream comprises communicating the second data stream over a point-to-point communication link between the first computing device and the second computing device.

12. The computer-implemented method according to claim 10, wherein the request is generated from a communication application to allow users at disparate locations to share audio and video data and application data.

13. The computer-implemented method according to claim 12, wherein the communication application is hosted by the data processing system and remotely accessible by the first computing device.

14. The computer-implemented method according to claim 10, wherein the first computing device and the second computing device are each a thin client computing device.

15. The computer-implemented method according to claim 10, wherein the request comprises input data associated with a communication application hosted by the data processing system.

16. The computer-implemented method according to claim 15, wherein the communication application hosted by the data processing system is remotely accessible by the first computing device.

17. An apparatus for enabling a first computing device to share a user interface (UI) with a second computing device, eliminating a need for the data processing system to connect directly to the second computing device thereby mitigating network congestion, the apparatus comprising:

means for generating, using a network connection between the first computing device and the data processing system, a first data stream comprising display data defining the UI;

means for communicating the first data stream to the first computing device, the first computing device configured to process the first data stream to display a first rendering of the UI on a display device of the first computing device;

means for receiving, from the first computing device, a request to share the UI;

in response to the request, generating a second data stream comprising the display data defining the UI; and communicating the second data stream to the first computing device concurrently with, but separately from, the first data stream, the communication of the second data stream causing the first computing device to communicate the second data stream to the second computing device, the second data stream causing the second computing device to display a second rendering of the UI on a display device of the second computing device.

18. The apparatus according to claim 17, wherein the application display data is associated with an application hosted by the apparatus, the application executed by the apparatus and remotely accessible by the first computing device.

19. The apparatus according to claim 18, wherein the application hosted by the apparatus is a productivity application or web browser application.

20. The apparatus according to claim 17, wherein the request is received from a communication application, the communication application being a collaboration communication application configured to enable sharing of audio and video data and application data between computing devices.

* * * * *